United States Patent
Han et al.

(10) Patent No.: US 9,847,827 B2
(45) Date of Patent: Dec. 19, 2017

(54) METHOD AND SYSTEM FOR TRANSMITTING DATA IN WIRELESS LOCAL AREA NETWORK

(71) Applicant: ZTE CORPORATION, Shenzhen, Guangdong Province (CN)

(72) Inventors: Zhiqiang Han, Shenzhen (CN); Kaiying Lv, Shenzhen (CN); Weimin Xing, Shenzhen (CN); Nan Li, Shenzhen (CN); Bo Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 144 days.

(21) Appl. No.: 14/771,809

(22) PCT Filed: Dec. 31, 2013

(86) PCT No.: PCT/CN2013/091031
§ 371 (c)(1),
(2) Date: Sep. 1, 2015

(87) PCT Pub. No.: WO2014/139314
PCT Pub. Date: Sep. 18, 2014

(65) Prior Publication Data
US 2016/0028466 A1   Jan. 28, 2016

(30) Foreign Application Priority Data
Mar. 11, 2013   (CN) .......................... 2013 1 0076741

(51) Int. Cl.
*H04B 7/14* (2006.01)
*H04L 12/28* (2006.01)
(Continued)

(52) U.S. Cl.
CPC ............ *H04B 7/14* (2013.01); *H04L 5/0055* (2013.01); *H04L 12/28* (2013.01); *H04L 69/22* (2013.01);
(Continued)

(58) Field of Classification Search
CPC .. H04W 72/0446; H04W 88/04; H04L 5/0055
See application file for complete search history.

(56) References Cited

U.S. PATENT DOCUMENTS

2007/0248117 A1   10/2007 Zuniga et al.
2008/0045145 A1*   2/2008 Nakatsugawa ........ H04B 7/155
                                                        455/11.1

(Continued)

FOREIGN PATENT DOCUMENTS

CN   101313608 A   11/2008
CN   101433022 A   5/2009
(Continued)

OTHER PUBLICATIONS

XP068040176; Two-Hop Relay Function; IEEE 11-1211330r0; Nov. 12, 2012.
(Continued)

*Primary Examiner* — Shaq Taha
(74) *Attorney, Agent, or Firm* — Ling Wu; Stephen Yang; Ling and Yang Intellectual Property

(57) ABSTRACT

Disclosed are a method and system for transmitting data in a wireless local access network. The method includes: a first station sending a radio frame to a second station in an obtained transmission opportunity, and carrying, in the radio frame, notification information indicating that the second station uses the transmission opportunity to communicate with a third station. The technical scheme provided in embodiments of the present invention are applicable to transmission opportunity management in a data relay pro-
(Continued)

cess in the wireless local area network, to achieve the control right management of transmission opportunity under the control of the first station.

19 Claims, 6 Drawing Sheets

(51) Int. Cl.

| | |
|---|---|
| H04W 74/04 | (2009.01) |
| H04L 5/00 | (2006.01) |
| H04L 29/06 | (2006.01) |
| H04W 72/04 | (2009.01) |
| H04L 1/00 | (2006.01) |
| H04W 84/12 | (2009.01) |
| H04W 88/04 | (2009.01) |
| H04W 88/08 | (2009.01) |
| H04W 74/08 | (2009.01) |

(52) U.S. Cl.
CPC ....... *H04W 72/0446* (2013.01); *H04W 74/04* (2013.01); *H04L 1/00* (2013.01); *H04W 74/0816* (2013.01); *H04W 84/12* (2013.01); *H04W 88/04* (2013.01); *H04W 88/08* (2013.01)

(56) References Cited

U.S. PATENT DOCUMENTS

| | | | | |
|---|---|---|---|---|
| 2010/0135209 | A1* | 6/2010 | Harada | H04W 76/048 370/328 |
| 2012/0120867 | A1* | 5/2012 | Horiuchi | H04B 7/155 370/315 |
| 2013/0225166 | A1* | 8/2013 | Akhtar | H04W 24/02 455/435.1 |
| 2014/0160930 | A1* | 6/2014 | Kwon | H04W 16/26 370/235 |

FOREIGN PATENT DOCUMENTS

| | | |
|---|---|---|
| EP | 2299768 A1 | 3/2011 |
| EP | 2498564 A1 | 9/2012 |
| JP | 2006246357 A | 9/2006 |
| JP | 2008533933 A | 8/2008 |
| JP | 2009534994 A | 9/2009 |
| JP | 2011009850 A | 1/2011 |
| JP | 2012029283 A | 2/2012 |
| WO | 2014042595 A1 | 3/2014 |

OTHER PUBLICATIONS

XP068040474; Implicit ACK for Relay; IEEE 802.11-13/0075r0; Jan. 14, 2013.
XP068053704; TXOP Sharing Operation for Relay; IEEE 11-13/0288r0; Mar. 25, 2013.

* cited by examiner

METHOD AND SYSTEM FOR TRANSMITTING DATA IN WIRELESS LOCAL AREA NETWORK

TECHNICAL FIELD

The present document relates to the field of wireless communications, and more particularly, to a method and system for transmitting data in the wireless local area network.

BACKGROUND OF THE RELATED ART

Currently in the field of wireless networks, the wireless local area network (WLAN) develops rapidly and there are growing application requirements of the WLAN. The Institute of Electrical and Electronic Engineers (IEEE) industry specification IEEE802.11 group has defined a series of the most common WLAN technologies such as the 802.11a, 802.11b, and 802.11g standards, and subsequently other task groups have appeared and are dedicated to developing improved standards related to the existing 802.11 technology. Wherein, the 802.11ah task group mainly develops WLAN air interface standards using the license-free frequency band under the 1 GHz to support new network applications such as smart grid and sensor networks.

The basic structure of the wireless local access network refers to one Basic Service Set (called BSS), comprising one access point (called AP) and multiple stations (STA) associated with the AP. The 802.11 defines two operating modes: Distributed Coordination Function (DCF) and Point Coordination Function (PCF), as well as improvements on the two operating modes: Enhanced Distributed Coordination Access (EDCA) function and Hybrid Coordination Function Controlled Channel Access (HCFCCA) function. Wherein, the DCF is the most basic operating mode that uses the Carrier Sense Multiple Access with Collision Avoidance (CSMA/CA) mechanism to make a plurality of stations share a radio channel. The EDCA function is the enhanced operating mode based on the CSMA/CA mechanism, supporting a plurality of different priority queues sharing the radio channel, and it uses transmission opportunity (called TXOP) as the unit to transmit data of each priority queue.

Using the license-free frequency band resources under 1 GHz can support communications in a wider range. However, the transmission time of the Physical Protocol Data Unit (PPDU) in the station in the BSS boundary will increase, it needs more power consumption, the battery life of the station is limited, and the replacement cycle is relatively long, meanwhile, in order to reduce the network complexity, it was proposed in the 802.11ah that it needs to support up to two-hop relay, namely, three-layer network architecture: root access point (Rt-AP), relay, and STA. The architectural structure is shown in FIG. 1. The relay is composed of two functional entities, wherein the first functional entity (Relay-STA (R-STA)) and the second functional entity (Rt-AP) are in the same BSS, namely, BSS1; the Relay-AP (R-AP) and the STA are in another BSS, namely, BSS2.

For the energy saving of the station, reducing the transmission delay of data packets, making the station forward or receive data as soon as possible, the transmission opportunity sharing which is used in the relay is proposed, as shown in FIG. 2. In the transmission opportunity sharing of the relay, when the relay acknowledges data of the AP, there are two acknowledgement methods: explicit acknowledgment and implicit acknowledgment. The explicit acknowledgement refers to acknowledging the data sent by the AP with a single acknowledgment frame, as shown in FIG. 2; the implicit acknowledgment refers to using an implicit acknowledgment for the data sent by the AP, and the implicit acknowledgment is contained in the data sent by the relay to the STA, as shown in FIG. 3. When the STA sends uplink data to the AP via the relay, the same scheme may also be used.

The abovementioned scheme is applicable to one frame transmission, but after the AP or STA obtains the channel by competition, when there are multiple frames to be transmitted and there is one frame to be transmitted to the relay, then the control right of channel is not at the party which obtains the channel by competition but is controlled by the relay, which is not conducive to the party obtaining the channel by competition to control the channel and the subsequent frame transmission. The AP or the STA may have a plurality of frames to be transmitted to the relay, then it needs to control the channel, which will contradict the idea that the relay can freely control the channel obtained by the AP or STA through competition.

In summary, in the existing transmission opportunity sharing mechanism, there is no method for effectively managing the control right of channel, which increase the data transmission delay and affects the data transmission efficiency.

SUMMARY OF THE INVENTION

The embodiment of the present invention provides a method and system for transmitting data in the wireless local access network to solve the problem that the existing transmission opportunity sharing mechanism affects the data transmission efficiency.

The embodiment of the present invention provides a method for transmitting data in a wireless local area network, comprising:

a first station transmitting a radio frame to a second station in an obtained transmission opportunity, and carrying, in the radio frame, notification information for the second station using the transmission opportunity to communicate with a third station.

Alternatively, the first station is an access point (AP), the second station is a relay, and the third station is a station (STA).

Alternatively, the first station is a STA, the second station is a relay, and the third station is an AP.

Alternatively, the first station transmitting the radio frame to the second station in an obtained transmission opportunity comprises:

the first station transmitting the radio frame to a first functional entity of the second station in the obtained transmission opportunity.

Alternatively, the radio frame carries the notification information in a physical header or a Media Access Control (MAC) header, and the notification information is 1-bit or multi-bit information bit or signaling bit; the notification information indicates whether the second station uses the transmission opportunity to communicate with the third station or not.

Alternatively, when the notification information indicates permitting the second station to use the transmission opportunity to communicate with the third station, the physical header or the MAC header further carries a transmission time length limit of the second station communicating to the third station.

Alternatively, a starting boundary of the transmission time length limit of the second station communicating to the third station is a boundary at which the radio frame transmitted by the first station to the second station is complete.

Alternatively, an ending boundary of the transmission time length limit of the second station communicating to the third station is a boundary which a superimposition of the starting boundary and the transmission time length limit of the second station communicating to the third station points to.

Alternatively, the method further comprises: when the notification information indicates permitting the second station to use the transmission opportunity to communicate with the third station, after the first station transmits the radio frame to the second station in the obtained transmission opportunity, the first station receiving a radio frame transmitted by the second station, wherein the radio frame carries 1-bit or multi-bit information, and the information indicates that the second station accepts the first station's indication of using the transmission opportunity.

Alternatively, the method further comprises: after the first station receives the radio frame transmitted by the second station, the first station entering into dormancy.

Alternatively, the method further comprises: when the notification information indicates permitting the second station to use the transmission opportunity to communicate with the third station, after the first station transmits the ratio frames to the second station in the obtained transmission opportunity, the first station receiving the radio frame transmitted by the second station, wherein the radio frame carries 1-bit or multi-bit information, and the information indicates that the second station does not accept the first station's indication of using the transmission opportunity.

Alternatively, the method further comprises: after the first station receives the radio frame transmitted by the second station, the first station continuing to use the transmission opportunity or releasing the transmission opportunity.

Alternatively, the method further comprises: when the notification information indicates permitting the second station to use the transmission opportunity to communicate with the third station, after the first station transmits the radio frame to the second station in the obtained transmission opportunity, the second station transmitting radio frame to the third station within remaining transmission opportunity time, wherein the remaining transmission opportunity time is the time of subsequently using the transmission opportunity, and an ending boundary of the remaining transmission opportunity time falls within the ending boundary of the transmission time limit of the second station communicating to the third station.

Alternatively, the remaining transmission opportunity time is reserved in the physical header or the MAC header of the radio frames transmitted by the second station to the third station.

Alternatively, the ending boundary of the remaining transmission opportunity time falls within the ending boundary of the transmission time length limit of the second station communicating to the third station.

Alternatively, the method further comprises: after the second station transmits the radio frames to the third station within the remaining transmission opportunity time, after all the radio frames to be transmitted to the third station are transmitted completely, the second station using the remaining time of the remaining transmission opportunity time to continue transmitting the to-be-transmitted radio frames to other stations.

Alternatively, the method further comprises: after the second station transmits radio frames to the third station within the remaining transmission opportunity time, when the third station enters into dormancy and cannot receive the radio frames, the second station using the remaining time of the remaining transmission opportunity time to continue transmitting the to-be-transmitted radio frames to other stations.

Alternatively, the method further comprises: after the second station transmits the radio frames to the third station within the remaining transmission opportunity time, the second station requesting the first station to release the transmission opportunity, and requesting to return the control right of the transmission opportunity to the first station.

The embodiment of the present invention further provides a method for transmitting data in a wireless local area network, comprising:

a second station receiving a radio frame transmitted by a first station within a transmission opportunity obtained by the first station, wherein the radio frame carries notification information for the second station using the transmission opportunity to communicate with a third station.

Alternatively, the first station is an access point (AP), the second station is a relay, and the third station is a station (STA).

Alternatively, the first station is a STA, the second station is a relay, and the third station is an AP.

Alternatively, the radio frame carries the notification information in a physical header or a media access control (MAC) header, and the notification information is 1-bit or multi-bit information bit or signaling bit; and the notification information indicates whether the second station uses the transmission opportunity to communicate with the third station or not.

Alternatively, the method further comprises: when the notification information indicates permitting the second station to use the transmission opportunity to communicate with the third station, after the second station receives the radio frame transmitted by the first station within the transmission opportunity obtained by the first station, the second station using one or more bits in a radio frame subsequently transmitted to the first station to indicate that the second station accepts the permission of the first station and uses the transmission opportunity to transmit radio frames to the third station.

Alternatively, the method further comprises: when the notification information indicates permitting the second station to use the transmission opportunity to communicate with the third station, after the second station receives the radio frame transmitted by the first station within the transmission opportunity obtained by the first station, the second station using one or more bits in the radio frame subsequently transmitted to the first station to indicate that the second station does not accept the permission of the first station and the first station continues to use the transmission opportunity.

Alternatively, the method further comprises: after the second station receives the radio frame transmitted by the first station within the transmission opportunity obtained by the first station, a second functional entity of the second station transmitting radio frames to the third station.

The embodiment of the present invention further provides a system for transmitting data in a wireless local access network, comprising a first station, a second station and a third station, wherein:

the first station is configured to: transmit a radio frame to the second station within an obtained transmission opportunity, and carry, in the radio frame, notification information for the second station using the transmission opportunity to communicate with the third station; and the second station is configured to: receive the radio frame transmitted by the first station within the transmission opportunity obtained by the first station, wherein the radio frame carries the notification information for the second station using the transmission opportunity to communicate with the third station.

Alternatively, the first station is an access point (AP), the second station is a relay, and the third station is a station (STA).

Alternatively, the first station is a STA, the second station is a relay, and the third station is an AP.

Alternatively, the radio frame carries the notification information in the physical header or media access control (MAC) header, and the notification information is 1-bit or multi-bit information bit or signaling bit; the notification information indicates whether the second station uses the transmission opportunity to communicate with the third station or not.

Alternatively, the second station is further configured to: when the notification information indicates permitting the second station to use the transmission opportunity to communicate with the third station, use one or more bits in a radio frame subsequently transmitted to the first station to indicate that the second station accepts the permission of the first station and uses the transmission opportunity to transmit radio frames to the third station; and the first station is further configured to: receive the radio frame transmitted by the second station, and enter into dormancy.

Alternatively, the second station is further configured to: when the notification information indicates permitting the second station to use the transmission opportunity to communicate with the third station, use one or more bits within the radio frame subsequently sent to the first station to indicate that the second station does not accept the permission of the first station and does not use the transmission opportunity to transmit radio frames to the third station; and the first station is further configured to: receive the radio frame transmitted by the second station, and continue to use the transmission opportunity.

The method and system for transmitting data in the wireless local area network provided in the embodiment of the present invention can be used to achieve the control right management of transmission opportunity under the control of the first station, to solve the problem that the existing transmission opportunity sharing mechanism affects the data transmission efficiency.

PREFERRED EMBODIMENTS OF THE INVENTION

Figure 1:
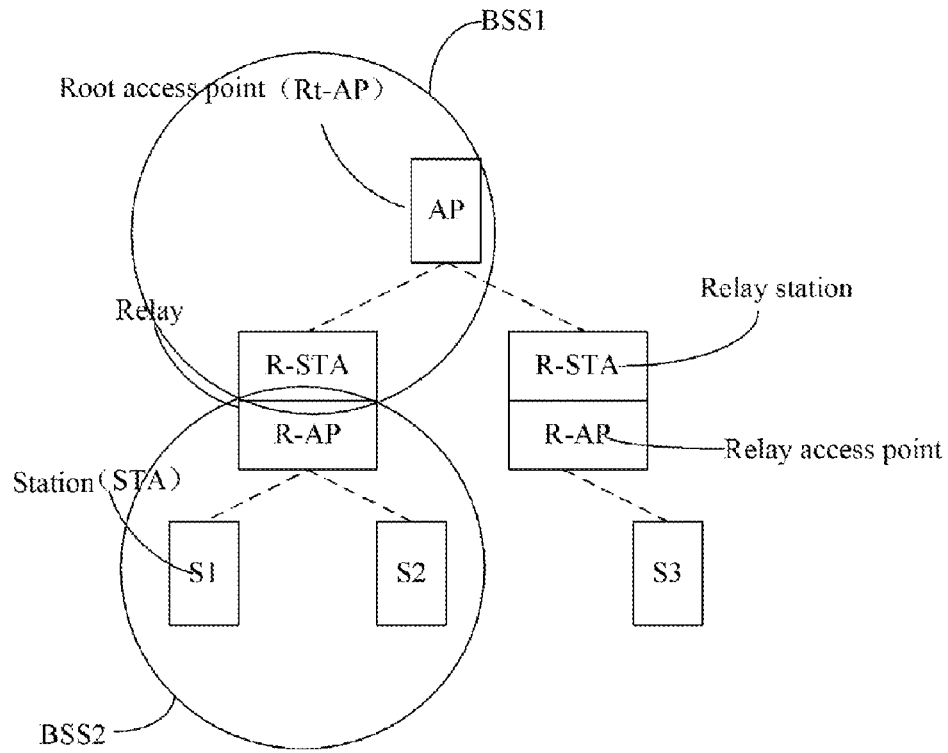
FIG. 1 is a schematic diagram of a relay system in the WLAN.
Figure 2:
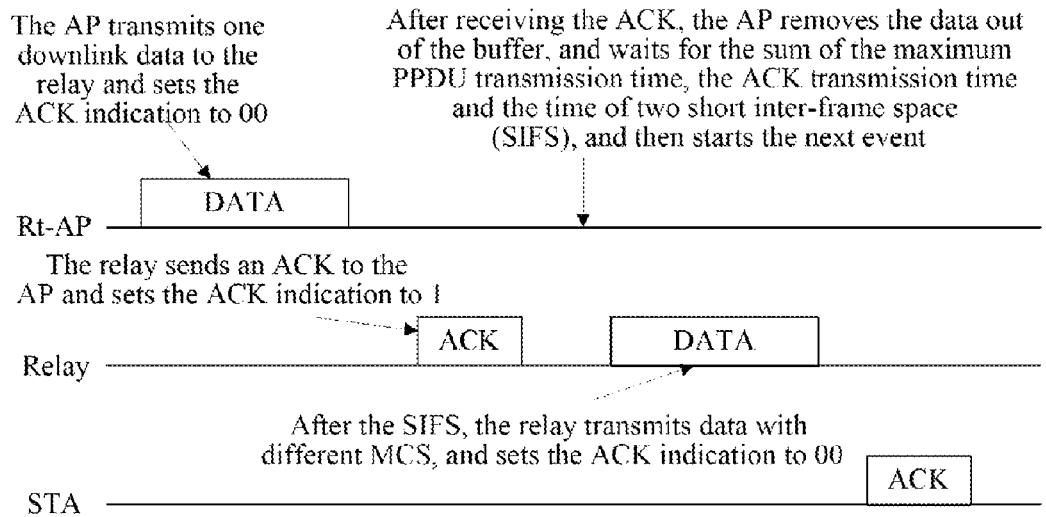
FIG. 2 is a schematic diagram of relay resource sharing.
Figure 3:
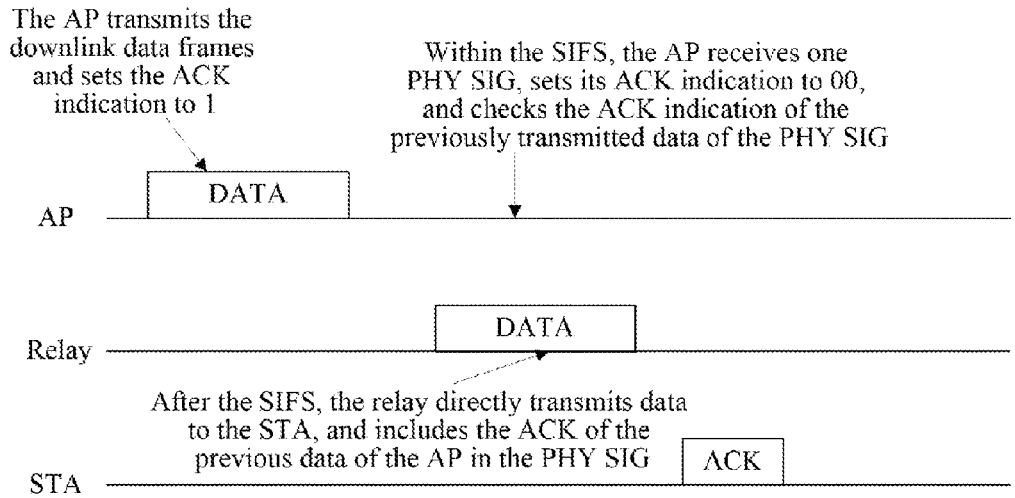
FIG. 3 is a schematic diagram of an implicit acknowledgment within the relay resource sharing.

When there are multiple frames to be transmitted after the AP or STA obtains the channel by competition, when one frame is transmitted to the relay, then the control right of channel is not at the party which obtains the channel by competition but at the relay, which is not conducive to the party which obtains the channel by competition to control the channel and transmit subsequent frames.

The AP may have a plurality of frames to transmit and need to control the channel, at this time, it needs to more effectively control the transmission opportunity to ensure the stability and efficiency of data transmission.

In order to solve the abovementioned problem, the embodiment of the present invention provides a method and system for transmitting data in the wireless local access network, and for the abovementioned problem, the technical scheme provided in the embodiment of the present invention provides a method for the station (such as AP or STA) which initiates the data transmission controlling the transmission opportunity, to solve the problem of transmission opportunity management when multiple parties share the transmission opportunity, and improve the multi-frame transmission efficiency and reduce the delay of data transmission. The first station detects the channel, and competes for the transmission opportunity through the CSMA/CA mechanism. Upon detecting an idle channel and when the data can be transmitted according to the CSMA/CA mechanism, the radio frames are transmitted to the second station. Moreover, 1-bit or multi-bit information bit or signaling bit in the radio frame are used to indicate whether to permit the second station to share the transmission opportunity obtained by the first station or not, and if the meaning indicated by the 1-bit or multi-bit signaling bit or information bit in the radio frame represents that it is not permitted for the second station to share the transmission opportunity obtained by the first station, the second station sends an acknowledgment to the first station according to the acknowledgement policy of radio frame. The first station can continue to transmit data to the second station or other stations after the acknowledgment.

If the meaning indicated by the 1-bit or multi-bit signaling bit or information bit in the radio frame represents that it is permitted for the second station to share the transmission opportunity obtained by the first station, meanwhile it can indicate the total transmission time length limit of the second station communicating with the third station, and the meaning indicated by the 1-bit or multi-bit signaling bit or information bit in the radio frame, which is transmitted by the first station to the second station and received by the second station, is that it is permitted for the present station to share the transmission opportunity obtained by the first station, then the second station acknowledges the radio frames transmitted by the first station according to the acknowledgment policy of radio frame or the implicit acknowledgement, and the acknowledgment information transmitted by the first station comprises information whether the second station accepts the transmission opportunity shared by the first station or not.

If the information bit is used to indicate not accepting the first station's permission of the second station using the transmission opportunity in the acknowledgment transmitted by the second station to the first station, the second station cannot transmit data to the third station after the Short Inter-Frame Space (SIFS) of the acknowledgement. After receiving the radio frame without accepting the transmission opportunity sharing from the second station, the first station can continue transmitting data to other stations after the SIFS.

If the information bit is used to indicate accepting the first station's permission of the second station using the transmission opportunity in the acknowledgment transmitted by the second station to the first station, the second station can transmit data to the third station after the SIFS of the acknowledgment, and the transmission time length of the second station and the third station (including the previous acknowledgment) can not exceed the transmission time length limit of the first station. If the second station finds out that the third station is in dormancy, the second station transmits data to other stations in the obtained shared transmission opportunity.

After receiving the indication of accepting the transmission opportunity sharing from the second station, the first station can enter into dormancy.

After the second station accepts the transmission opportunity shared by the first station, its data to be transmitted to the third station have been transmitted completely, and the second station can continue to use the shared transmission opportunity to transmit data to other stations or return the shared transmission opportunity to the first station.

After receiving the shared transmission opportunity returned by the second station, the first station can transmit data to other relays or the STA after the SIFS.

The abovementioned frame exchange cannot exceed the transmission opportunity limit of the first station.

Hereinafter, in conjunction with the accompanying figures, the embodiments of the present invention will be described in detail. It should be noted that, in the case of no conflict, embodiments and features in the embodiments of the present application may be arbitrarily combined with each other.

The application scenario according to the embodiment of the present invention is an embodiment wherein three parties in the wireless local access network perform transmission opportunity sharing, including an AP, a relay, and a STA, as shown in FIG. 1. In the following embodiment, the notification information indicating that the second station uses the transmission opportunity to communicate with the third station is represented with a relay transmission opportunity sharing field, and the notification information (relay transmission opportunity sharing field) may be 1-bit or multi-bit information bit or signaling bit, and the notification information indicates whether the second station uses the transmission opportunity to communicate with the third station or not, and in the following one bit is used as an example for illustration.

The First Embodiment

The embodiment of the present invention takes the AP as the first station, the relay as the second station, and the STA as the third station for example to illustrate.

Figure 4:
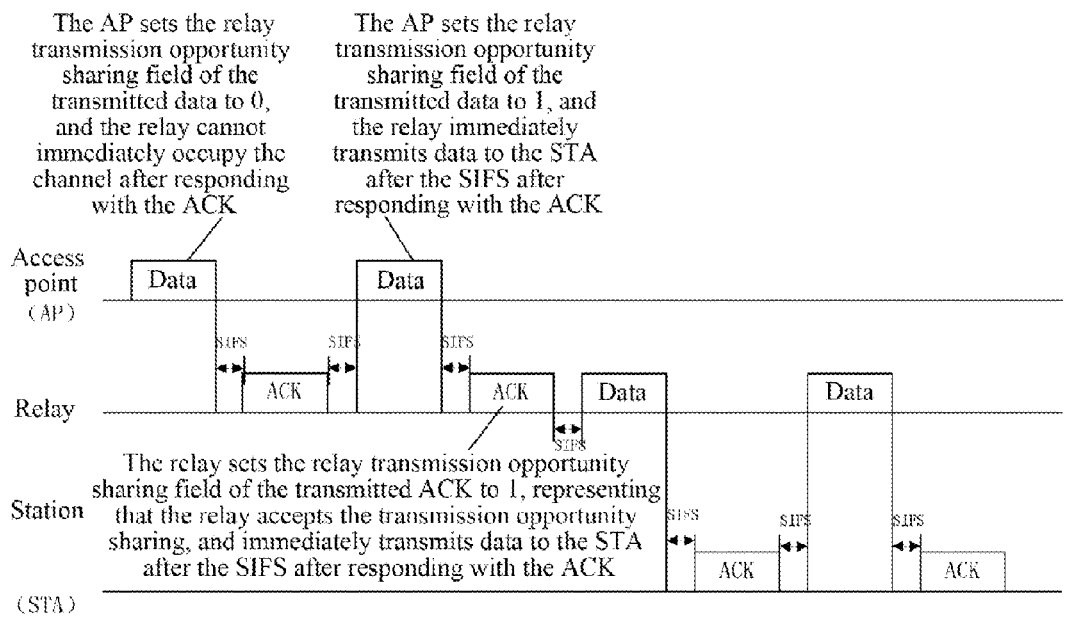
FIG. 4 is a schematic diagram of a frame exchange of an access point sharing an obtained transmission opportunity to the relay.

As shown in FIG. 4, the AP has a radio frame to be transmitted to the STA through the relay. The AP starts to detect the channel and competes for the transmission opportunity through the CSMA/CA mechanism. Upon detecting an idle channel and when the data can be transmitted according to the CSMA/CA mechanism, the AP starts to transmit radio frames to the relay and sets the relay transmission opportunity sharing field of the radio frames to 0, which represents that the transmission opportunity sharing has not been performed. The AP transmits radio frames to the first functional entity of the relay.

After receiving the radio frames transmitted by the AP, the relay checks that the value of the relay transmission opportunity sharing field carried in the radio frame is 0, and the relay performs an acknowledgement (ACK) on the received radio frames after the SIFS. After responding with the ACK, the relay cannot directly transmit radio frames to the STA after the SIFS.

After receiving the response from the relay, the AP continues to transmit radio frames to the relay after the SIFS, and it reserves the transmission time length limit t0 of the second station communicating to the third station in the physical header or the MAC header of the radio frame, and sets the relay transmission opportunity sharing field carried in the radio frame to 1, representing that the subsequent use of the transmission opportunity is controlled by the relay, but the relay cannot extend the time t0 reserved by the AP in the subsequent transmission. The starting boundary of the transmission time length limit t0 of the second station communicating to the third station is the boundary at which the radio frame transmitted by the first station to the second station is complete, and the ending boundary is the boundary which the superimposition of the starting boundary and the transmission time length limit t0 of the second station communicating to the third station points to.

After receiving the radio frames from the AP, the relay checks that the value of relay transmission opportunity sharing field carried in the radio frame is 1, and the relay can perform explicit or implicit acknowledgment (herein using the explicit acknowledgment for example) on the received radio frames after the SIFS. When responding to the ACK, the relay sets the relay transmission opportunity sharing field to 1 or sets the ACK indication to 11 or uses additional bits to represent accepting the transmission opportunity sharing of the AP.

Figure 6:
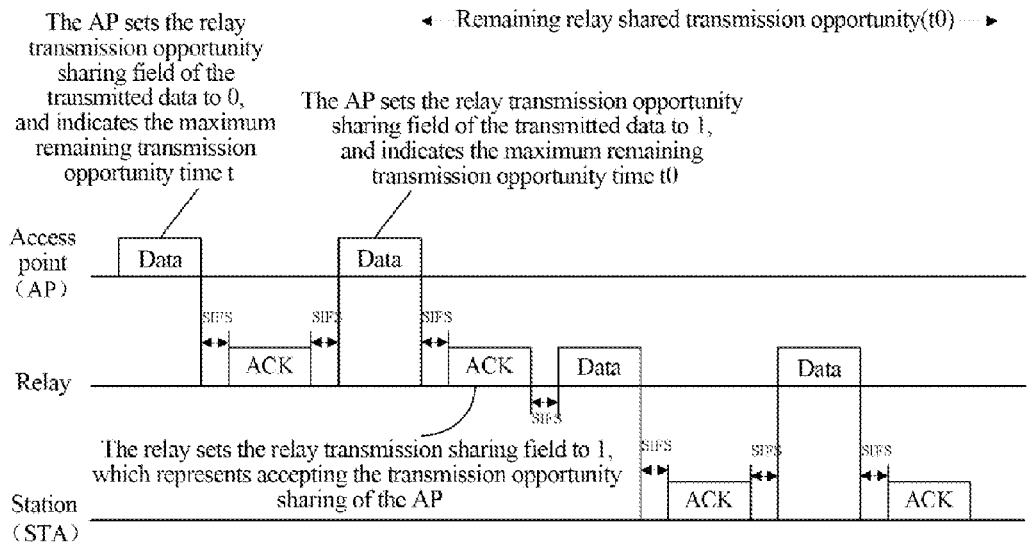
FIG. 6 is a schematic diagram of reserving a transmission opportunity in a header.
Figure 8:
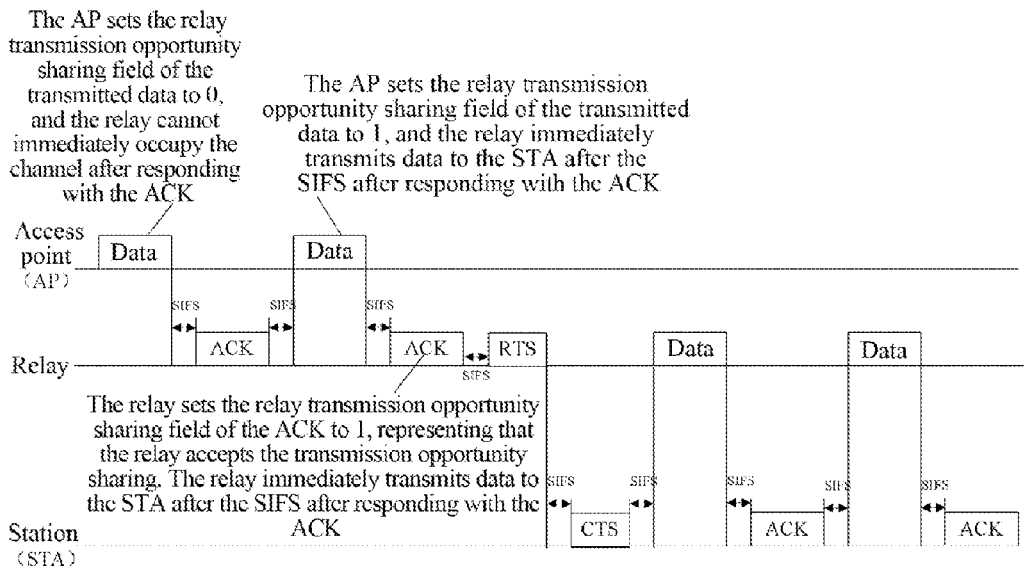
FIG. 8 is a schematic diagram of using a short frame protection channel after the transmission opportunity sharing.

After responding to the ACK, the relay directly transmits radio frames to the STA after the SIFS, and reserves the remaining transmission opportunity time t1 in the physical header or the MAC header of the radio frame, and the time ending boundary of the t1 cannot exceed the time ending boundary of the t0, as shown in FIG. 6. Or after responding to the ACK, the relay first performs channel reservation with the STA after the SIFS, as shown in FIG. 8, and the radio frames are transmitted after performing the channel reservation with the Request to Send (RTS) frame, the clear to send (CTS) frame or other frames.

Figure 11:
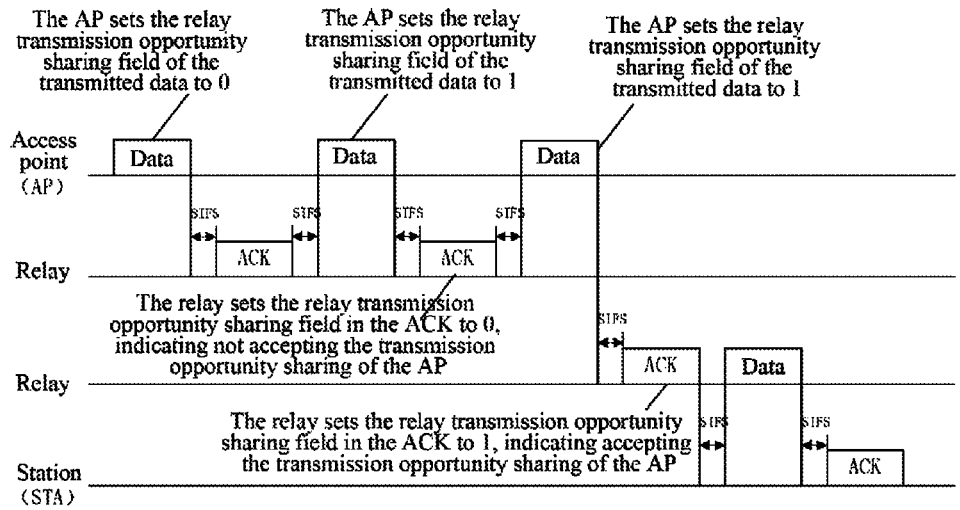
FIG. 11 is a schematic diagram of including a transmission opportunity sharing rejection.

After receiving the radio frame with explicit or implicit acknowledgment from the relay, the AP checks whether the relay accepts this transmission opportunity sharing (the radio frame carries 1-bit or multi-bit information, and the information indicates whether the second station accepts the first station's indication of using the transmission opportunity or not) or not. If the explicit or implicit acknowledgment indicates that the relay accepts the transmission opportunity sharing, the AP can enter into dormancy or waiting for the relay exchanging the transmission opportunity or releasing the transmission opportunity in the remaining TXOP. If the explicit acknowledgment indicates that the relay does not accept the transmission opportunity sharing, the AP can transmit data to other relays or the STA after the SIFS, as shown in FIG. 11.

The STA transmits an acknowledgment to the relay after receiving the SIFS of the radio frame. The relay checks whether the remaining transmission opportunity control time is enough to perform one frame exchange or not, if the remaining time is enough for one frame exchange, the relay uses the same way to continue transmitting radio frames to the STA, until the radio frames have been transmitted completely or the remaining transmission opportunity time is not enough to carry out one frame exchange.

The relay can use the transmission opportunity end frame (that is, Contention Free-End (CF-End) frame) to release the remaining transmission opportunity, and after receiving the transmission opportunity end frame from the relay, the AP may send the transmission opportunity end frame to release the transmission opportunity after the SIFS.

After accepting the transmission opportunity sharing from the AP, the relay may return the transmission opportunity to the AP, and the method used can be sending the AP a radio frame explicit or implicit indication to request to release the transmission opportunity, and returning the control right of transmission opportunity to the first station AP. After the relay returns the transmission opportunity, the AP can transmit data to the relay or the STA after the SIFS.

The Second Embodiment

The embodiment of the present invention takes the STA as the first station, the relay as the second station, and the AP as the third station for example to illustrate.

Figure 5:
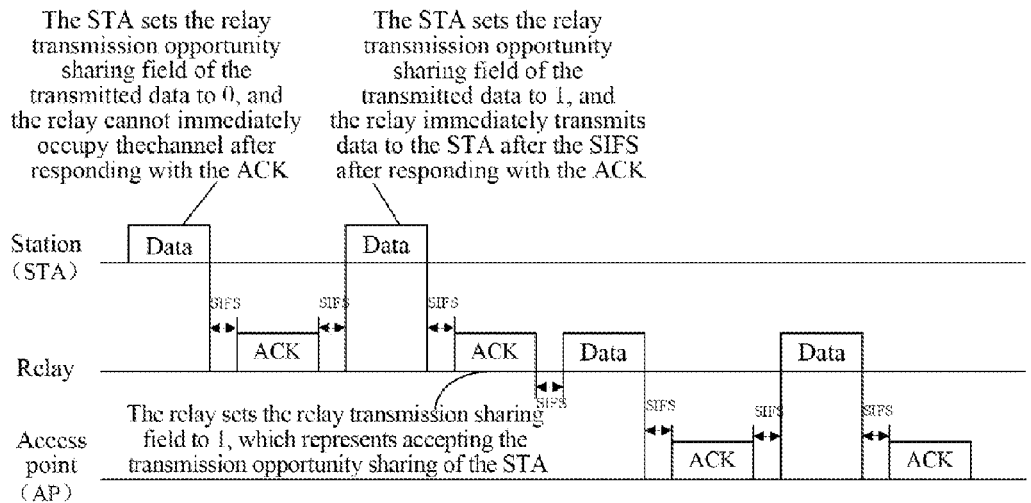
FIG. 5 is a schematic diagram of a frame exchange of a station sharing an obtained transmission opportunity to the relay.

As shown in FIG. 5, the STA has a plurality of frames to be transmitted to the AP. The STA starts detecting the channel, and competes for the transmission opportunity through the CSMA/CA mechanism. Upon detecting an idle channel and when the data can be transmitted through the CSMA/CA mechanism, the STA starts transmitting data (radio frames) to the relay, and sets the relay transmission opportunity sharing field carried in the physical header or the MAC header of the radio frame to 0, representing that the transmission opportunity sharing has not been performed for the relay. The STA transmits radio frames to the first functional entity of the relay.

After receiving the data from the STA, the relay checks that the value of the relay transmission opportunity sharing field is 0, and the relay performs an ACK on the received data after the SIFS. After responding to the ACK, the relay cannot directly transmit data to the AP after the SIFS.

After receiving the response from the relay, the STA transmits radio frames to the relay after the SIFS and reserves the transmission time length limit t0 of the second station communicating to the third station in the physical header or the MAC header of the radio frame, and sets the relay transmission opportunity sharing field carried in the radio frame to 1, representing that the subsequent use of the transmission opportunity is controlled by the relay, but the relay cannot extend the time t0 reserved by the STA in the subsequent transmission. The starting boundary of the transmission time length limit t0 of the second station communicating to the third station is the boundary at which the radio frame transmitted by the first station to the second station is complete, and the ending boundary is the boundary which the superimposition of the starting boundary and the transmission time length limit t0 of the second station communicating to the third station points to.

After receiving the data (radio frames) from the STA, the relay checks that the value of the relay transmission opportunity sharing field is 1, the relay performs an acknowledgement on the received data after the SIFS. It can perform an explicit or implicit acknowledgment (herein take the explicit acknowledgment for example) on the radio frames. When responding to the ACK, the relay sets the relay transmission opportunity sharing field to 1 or sets the ACK instruction to 11 or uses additional bits to represent accepting the transmission opportunity sharing of the STA.

After responding to the ACK, the relay directly transmits data to the AP after the SIFS.

The AP sends an ACK response to the relay after receiving the SIFS of the data. The relay checks whether the remaining transmission opportunity use time is enough for one frame exchange or not, and if the remaining time is enough for one frame exchange, the relay uses the same way to continue transmitting data to the AP, until the data are transmitted completely or the remaining time of the transmission opportunity is not enough for one frame exchange.

After receiving the explicit or implicit acknowledgment from the relay, the STA checks whether the relay accepts this transmission opportunity sharing or not. If the explicit or implicit acknowledgment indicates that the relay accepts the transmission opportunity sharing, the STA can enter into dormancy. If the explicit ACK indicates that the relay does not accept the transmission opportunity sharing, the STA can continue transmitting data to the relay or release this transmission opportunity or enter into dormancy.

The Third Embodiment

The embodiment of the present invention takes the AP as the first station, the relay as the second station and the STA as the third station for example to illustrate.

Figure 7:
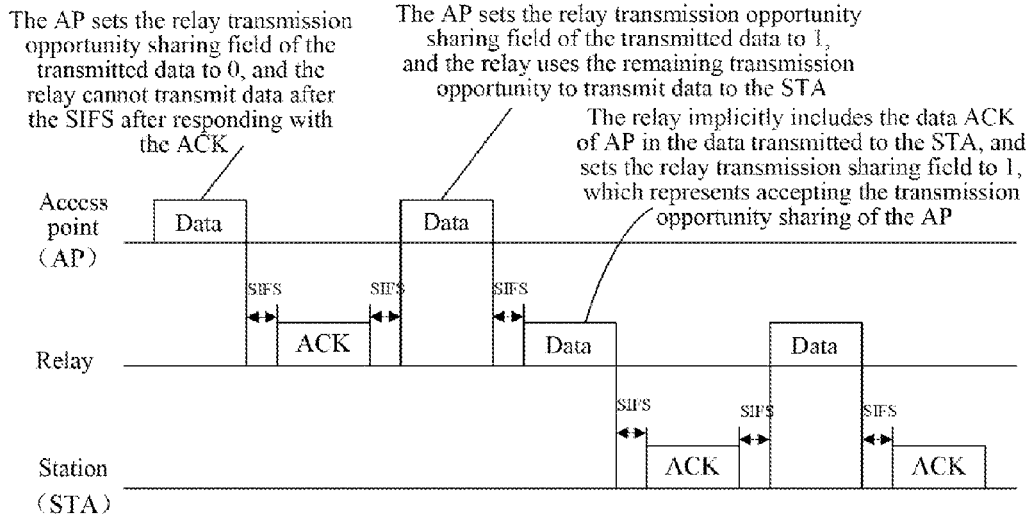
FIG. 7 is a schematic diagram of a transmission opportunity sharing of an implicit acknowledgement.

As shown in FIG. 7, the AP has radio frames to be transmitted to the STA. The AP starts to detect the channel and competes for the transmission opportunity through the CSMA/CA mechanism. Upon detecting an idle channel and when the data can be transmitted according to the CSMA/CA mechanism, the AP starts transmitting data (radio frames) to the relay and sets the relay transmission opportunity sharing field carried in the physical header or the MAC header of the radio frame to 0, which represents that the transmission opportunity sharing has not been performed yet. The AP transmits radio frames to the first functional entity of the relay.

After receiving the radio frames from the AP, the relay checks that value of the relay transmission opportunity sharing field is 0, and the relay performs an acknowledgement (ACK) on the received radio frames after the SIFS. After responding with the ACK, the relay cannot directly transmit data to the STA after the SIFS.

After receiving the response from the relay, the AP continues to transmit data to the relay after the SIFS and sets the relay transmission opportunity sharing field of the data to 1, representing that subsequent use of the transmission opportunity is controlled by the relay.

After receiving the data from the AP, the relay checks that the value of the relay transmission opportunity sharing field is 1, and the relay can perform an acknowledgment on the received data after the SIFS. It may perform an explicit or implicit acknowledgment (here take the implicit acknowledgment for example) on the radio frames.

When transmitting radio frames to the STA, the relay sets the relay transmission opportunity sharing field to 1 or sets the ACK indication to 11 or uses additional bits to represent that the replay accepts the transmission opportunity sharing of the AP.

The STA sends an ACK response to the relay after receiving the SIFS of the data. The relay checks whether the remaining time is enough to perform one frame exchange or not, and if the remaining time is enough for one frame exchange, the relay uses the same way to continue transmitting data to the STA, until the data have been transmitted completely or the remaining transmission opportunity time is not enough for one frame exchange.

After receiving the implicit acknowledgment from the relay, the AP checks whether the relay accepts this transmission opportunity sharing or not. If the implicit acknowledgment indicates that the relay accepts the transmission opportunity sharing, the AP can wait for the relay to return the transmission opportunity or re-compete for the channel. If the implicit acknowledgment indicates that the relay does not accept the transmission opportunity sharing, the AP can transmit data to other relays or the STA after the SIFS.

After accepting the transmission opportunity sharing of the AP, the relay may return the transmission opportunity to the AP, and the method used can be sending the AP a radio frame explicit indication or implicit indication to indicate returning the transmission opportunity. After the relay returns the transmission opportunity, the AP can transmit data to the relay or the STA after the SIFS.

The Fourth Embodiment

The embodiment of the present invention takes the AP as the first station, the relay as the second station, and the STA as the third station for example to illustrate.

Figure 9:
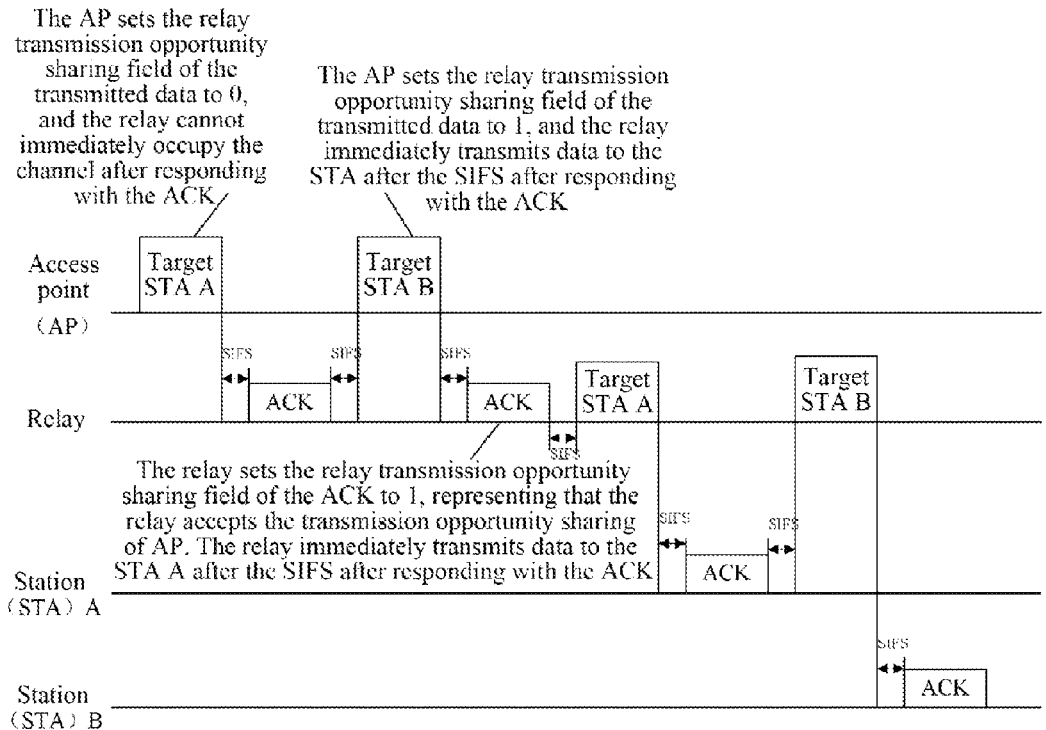
FIG. 9 is a schematic diagram of transmitting to a plurality of stations after the transmission opportunity sharing.

As shown in FIG. 9, the AP has radio frames to be transmitted to the STA A through the relay. The AP starts to detect the channel and competes for the transmission opportunity through the CSMA/CA mechanism. Upon detecting an idle channel and when the data can be transmitted according to the CSMA/CA mechanism, the AP starts to transmit radio frames to the relay and reserves the transmission time length limit t0 of the relay communicating with the STA A in the radio frames. The AP transmits radio frames to the first functional entity of the relay. The starting boundary of the transmission time length limit t0 of the relay communicating with the STA A is the boundary at which the radio frame is transmitted completely; the ending boundary of t0 is the boundary which the superimposition of the starting boundary and the t0 points to. The communication of the relay and the STAR A cannot exceed the ending boundary of the t0.

Moreover, the relay transmission opportunity sharing field carried in the physical header or the MAC header of the radio frame is set to 1, which represents permitting the relay to obtain the control right of channel after receiving the radio frame.

After receiving the radio frame from the AP, the relay checks that the value of the relay transmission opportunity sharing field carried in the radio frame is 1, and the relay performs an explicit or implicit acknowledgment (herein take the explicit acknowledgment for example) on the received radio frames after the SIFS. When responding with the ACK, the relay sets the relay transmission opportunity sharing field to 1 or sets the ACK indication to 11 or uses additional bits to represent accepting the transmission opportunity sharing of the AP.

The relay responds with the ACK after receiving the SIFS of the radio frame, if the relay finds out that the STA A is in the dormancy, the relay may transmit data to another station STA B after the SIFS after the ACK.

If the radio frames transmitted by the relay to the STA B have been transmitted completely, there is remaining transmission opportunity, it can continue to transmit to other stations until the to-be-transmitted radio frames have been transmitted completely or the remaining time of the transmission opportunity is not enough for one frame exchange.

Furthermore, after the relay obtains the transmission opportunity obtained by the AP through the relay transmission opportunity sharing field, if the relay can transmit the AP, at any time, one radio frame to release the obtained transmission opportunity, it can release the transmission opportunity through the radio frame implicit or explicit indication, the AP re-obtains control of the channel.

After receiving the explicit or implicit acknowledgment from the relay, the AP checks whether the relay accepts this transmission opportunity sharing or not. If the explicit or implicit acknowledgement indicates that the relay accepts the transmission opportunity sharing, then the AP waits for the relay to return the transmission opportunity, or re-competes for the channel. If the explicit acknowledgement indicates that the relay does not accept the transmission opportunity sharing, the AP can transmit data to other relays or the STA after the SIFS.

The Fifth Embodiment

The embodiment of the present invention takes the AP as the first station, the relay as the second station, and the STA A as the third station for example to illustrate.

Figure 10:
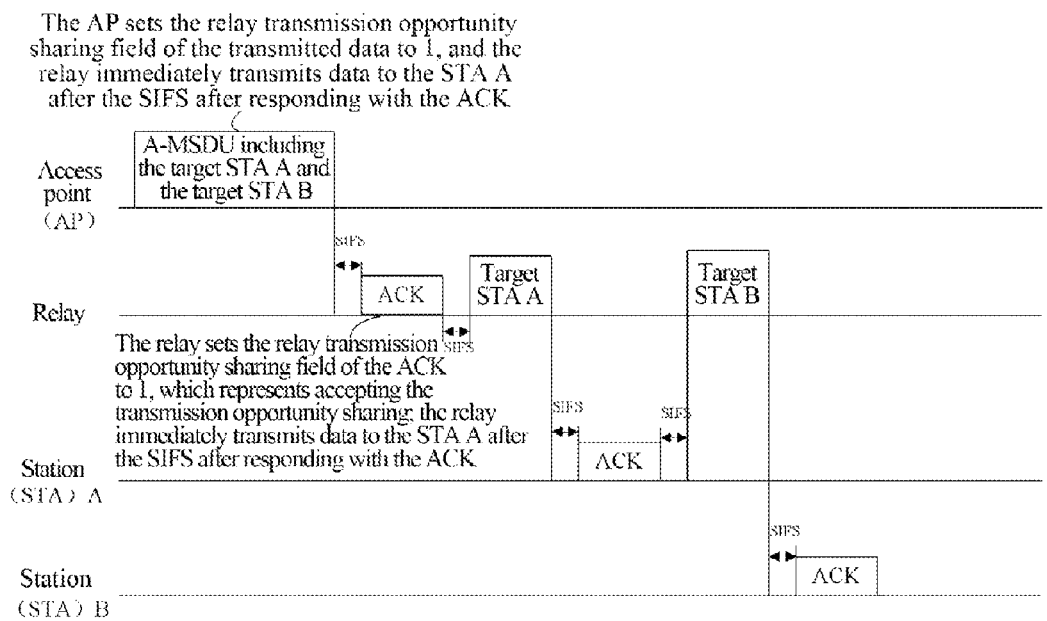
FIG. 10 is a schematic diagram of an aggregated frame transmission sharing.

As shown in FIG. 10, the AP has one radio frame to be transmitted to the STA A through the relay, the radio frame (the frame uses the aggregation technique, and a plurality of unicast frames are aggregated in one radio frame in the MAC layer or the physical (PHY) layer) comprises unicast data of two target stations STA A and STA B. The transmission opportunity is competed through the CSMA/CA mechanism. Upon detecting an idle channel and when the data can be transmitted through the CSMA/CA mechanism, the AP starts transmitting the radio frame to the relay, the transmission time length limit t0 of the relay communicating with the STA A is reserved in the radio frame. The AP transmits the radio frame to the first functional entity of the relay. The starting boundary of the transmission time length limit t0 of the relay communicating to the STA A is the boundary at which the radio frame is transmitted completely; the ending boundary of the t0 is the boundary which the superimposition of the starting boundary and the t0 points to. The communication of the relay and the STAR A cannot exceed the ending boundary of the t0.

After performing the acknowledgement response on the radio frame, the relay can transmit the radio frame to the STA A after the SIFS, and after receiving the radio frame transmitted by the relay to the STA A, the STA A performs an acknowledgement on the radio frame after the SIFS according to the acknowledgement policy, and if the remaining transmission opportunity time is enough for one frame exchange after the relay receives the acknowledgment from the STA A, then the relay uses the same way to continue transmitting data to the STA B, until the data buffered by the relay have been transmitted completely or the remaining transmission opportunity is not enough for one frame exchange.

The Sixth Embodiment

Figure 12:
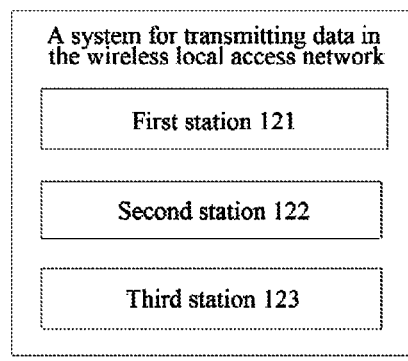
FIG. 12 is a schematic diagram of the structure of a system for transmitting data in the wireless local access network in accordance with an embodiment of the present invention.

As shown in FIG. 12, the embodiment of the present invention provides a system for transmitting data in the wireless local access network, comprising:

a first station 121, a second station 122 and a third station 123, wherein:

the first station 121 is used to: transmit radio frames to the second station 122 in an obtained transmission opportunity, and carry, in the radio frame, notification information indicating that the second station 122 uses the transmission opportunity to communicate with the third station 123; and the second station 122 is used to: receive the radio frames transmitted by the first station 121 in the transmission opportunity obtained by the first station 121, wherein the radio frame carries the notification information indicating that the second station 122 uses the transmission opportunity to communicate with the third station 123.

Alternatively, the first station 121 is an AP, the second station 122 is a relay, and the third station 123 is a STA.

Alternatively, the first station 121 is a STA, the second station 122 is a relay, and the third station 123 is an AP.

Alternatively, the radio frame carries the notification information in the physical header or MAC header, wherein the notification information is 1-bit or multi-bit information bit or signaling bit; the notification information indicates whether the second station 122 uses the transmission opportunity to communicate with the third station 123 or not.

Alternatively, the second station 122 is further used to: when the notification information indicates permitting the second station 122 to use the transmission opportunity to communicate with the third station 123, use one or more bits in the radio frame subsequently transmitted to the first station 121 to indicate that the second station 122 accepts the permission of the first station 121 and use the transmission opportunity to transmit radio frames to the third station 123; and the first station 121 is further used to: receive the radio frames transmitted by the second station 122, and enter into dormancy.

Alternatively, the second station 122 is further used to: when the notification information indicates permitting the second station 122 to use the transmission opportunity to communicate with the third station 123, use one or more bits in the radio frame subsequently transmitted to the first station 121 to indicate that the second station 122 does not accept the permission of the first station 121 and does not use the transmission opportunity to transmit radio frames to the third station 123; and the first station 121 is further used to: receive the radio frames transmitted by the second station 122, and continue to use the transmission opportunity.

Alternatively, when the notification information indicates permitting the second station 122 to use the transmission opportunity to communicate with the third station 123, the physical header or the MAC header further carries the transmission time length limit of the second station 122 communicating to the third station 123.

Alternatively, The starting boundary of the transmission time length limit of the second station 122 communicating to the third station 123 is the boundary at which the radio frame transmitted by the first station 121 to the second station 122 is complete.

Alternatively, the ending boundary of the transmission time length limit of the second station 122 communicating to the third station 123 is a boundary which the superimposition of the starting boundary and the transmission time length limit of the second station 122 communicating to the third station 123 points to.

Alternatively, the second station 122 is further used to: transmit radio frames to the third station 123, and reserve the remaining transmission opportunity time in the physical header of the MAC header of the radio frame, wherein the remaining transmission opportunity time is the time of subsequently using the transmission opportunity, to indicate that the third station 123 is prohibited to continue the relay; and the third station 123 is used to: receive the radio frames transmitted by the second station 122.

Alternatively, the third station 123 is used to receive the radio frames transmitted by the second functional entity of the second station 122.

Alternatively, the ending boundary of the remaining transmission opportunity time falls within the ending boundary of the transmission time length limit of the second station 122 communicating to the third station 123.

Alternatively, the second station 122 is further used to: after all the radio frames to be transmitted to the third station 123 have been transmitted completely, use the remaining time of the remaining transmission opportunity time to continue transmitting the to-be-transmitted radio frames to other stations.

Alternatively, the second station 122 is further used to: when the third station 123 is in dormancy and can not receive the radio frames, use the remaining time of the remaining transmission opportunity time to continue transmitting the to-be-transmitted radio frames to other stations.

Alternatively, the second station is further used to: request the first station 121 to release the transmission opportunity, and request to return the control right of the transmission opportunity to the first station 121.

Alternatively, the radio frame comprises unicast data of the third station 123 and one or more other stations;

the second station 122 may further be used to: after all the radio frames to be transmitted to the third station 123 have been transmitted completely, use the remaining time of the remaining transmission opportunity time to transmit unicast data to the one or more other stations.

Alternatively, the radio frame comprises unicast data of the third station 123 and the one or more other stations;

the second station 122 is further used to: when the third station 123 cannot receive the radio frames, use the remaining time of the remaining transmission opportunity time to transmit unicast data to the one or more other stations.

Alternatively, the second station 122 is further used to: when the notification information indicates that the second station 122 can not use the transmission opportunity to communicate with the third station 123, continue to wait for receiving the subsequent radio frames transmitted by the first station 121, or compete for the channel.

With the method and system for transmitting data in the wireless local area network provided in the embodiment of the present invention, the first station transmits radio frames to the second station in an obtained transmission opportunity, and carries, in the radio frame, notification information indicating that the second station uses the transmission opportunity to communicate with the third station, to achieve the management control right of transmission opportunity under the control of the first station, thus solving the problem that the existing transmission opportunity sharing mechanism affects the data transmission efficiency.

During the process of the AP transmitting data to the STA, the AP authorizes the transmission opportunity control of the relay; during the process of the STA transmitting data to the AP, and the STA authorizes the transmission opportunity control of the relay. The winner of the competition of the transmission opportunity controls and manages the use of the transmission opportunity, to better meet the needs of data transmission.

Those ordinarily skilled in the art can understand that all or some of the steps of the abovementioned embodiments may be implemented using a computer program process, and the computer program may be stored in a computer-readable storage medium and executed in an appropriate hardware platform (such as a system, equipment, apparatus, device, and so on), and during the execution, it comprises one of the steps of the method embodiment or a combination thereof.

Alternatively, all or some of the steps of the abovementioned embodiments can also be implemented with integrated circuits, and these steps may be made into individual integrated circuit modules respectively, or some of the modules or steps can be made into a single integrated circuit module for implementation. Therefore, the present document is not limited to any specific combination of hardware and software.

Each apparatus/functional module/functional unit in the abovementioned embodiments may be implemented with universal computing apparatus, and they can be concentrated in a single computing apparatus or distributed in a network composed of a plurality of computing apparatuses.

When each device/functional module/functional unit in the abovementioned embodiments are implemented in the form of software functional module and sold or used as an individual product, they may be stored in a computer readable storage medium. The abovementioned computer-readable storage medium may be a read-only memory, magnetic or optical disk, and the like.

Any person skilled in the art can easily think of changes or replacements within the technical scope disclosed in the present document, and these changes and substitutions should fall within the protection scope of the present document. Accordingly, the protection scope of the present document should be subject to the protection scope of the claims.

INDUSTRIAL APPLICABILITY

The method and system provided in the embodiment of the present invention can be used to achieve the control right management of transmission opportunity under the control of the first station, to solve the problem that the existing transmission opportunity sharing mechanism affects the data transmission efficiency.

What is claimed is:

1. A method for transmitting data in a wireless local area network, comprising:
a first station transmitting a radio frame to a second station in an obtained transmission opportunity, and carrying, in the radio frame, notification information for the second station using the transmission opportunity to communicate with a third station;
wherein the notification information indicates whether the second station uses the transmission opportunity to communicate with the third station or not;
when the notification information indicates permitting the second station to use the transmission opportunity to communicate with the third station, after the first station transmits the radio frame to the second station in the obtained transmission opportunity,
the first station receiving a radio frame transmitted by the second station, wherein the radio frame carries 1-bit or multi-bit information, and the information indicates that the second station accepts an indication of the first station to use the transmission opportunity;
or,
the first station receiving a radio frame transmitted by the second station, wherein the radio frame carries 1-bit or multi-bit information, and the information indicates that the second station does not accept an indication of the first station to use the transmission opportunity.

2. The method of claim 1, wherein,
the first station is an access point (AP), the second station is a relay, and the third station is a station (STA);
or
the first station is a STA, the second station is a relay, and the third station is an AP.

3. The method of claim 1, wherein the first station transmitting the radio frame to the second station in the obtained transmission opportunity comprises:
the first station transmitting the radio frame to a first functional entity of the second station in the obtained transmission opportunity.

4. The method of claim 2, wherein,
the radio frame carries the notification information in a physical header or a Media Access Control (MAC) header, and the notification information is 1-bit or multi-bit information bit or signaling bit.

5. The method of claim 4, wherein,
when the notification information indicates permitting the second station to use the transmission opportunity to communicate with the third station, the physical header or the MAC header further carries a transmission time length limit of the second station communicating to the third station,
preferably, a starting boundary of the transmission time length limit of the second station communicating to the third station is a boundary at which the radio frame transmitted by the first station to the second station is complete;
or
an ending boundary of the transmission time length limit of the second station communicating to the third station is a boundary which a superimposition of the starting boundary and the transmission time length limit of the second station communicating to the third station points.

6. The method of claim 1, further comprising:
after the first station receives the radio frame transmitted by the second station, wherein the radio frame carries 1-bit or multi-bit information, and the information indicates that the second station accepts an indication of the first station to use the transmission opportunity;
the first station entering into dormancy.

7. The method of claim 1, further comprising:
after the first station receives the radio frame transmitted by the second station, wherein the radio frame carries 1-bit or multi-bit information, and the information indicates that the second station does not accept an indication of the first station to use the transmission opportunity, the first station continuing to use the transmission opportunity or releasing the transmission opportunity.

8. The method of claim 4, further comprising: when the notification information indicates permitting the second station to use the transmission opportunity to communicate with the third station, after the first station transmits the radio frame to the second station in the obtained transmission opportunity, the second station transmitting a radio frame to the third station within remaining transmission opportunity time, wherein the remaining transmission opportunity time is time of subsequently using the transmission opportunity, and an ending boundary of the remaining transmission opportunity falls within an ending boundary of transmission time limit of the second station communicating to the third station.

9. The method of claim 8, wherein, the remaining transmission opportunity time is reserved in a physical header or a MAC header of the radio frame transmitted by the second station to the third station.

10. The method of claim 8, wherein, the ending boundary of the remaining transmission opportunity time falls within an ending boundary of transmission time length limit of the second station communicating to the third station.

11. The method of claim 8, further comprising: after the second station transmits the radio frame to the third station within the remaining transmission opportunity time, after all radio frames to be transmitted to the third station are transmitted completely, the second station using remaining time of the remaining transmission opportunity time to continue transmitting to-be-transmitted radio frames to other stations;

or further comprising: after the second station transmits the radio frame to the third station within the remaining transmission opportunity time, when the third station enters into dormancy and cannot receive the radio frame, the second station using remaining time of the remaining transmission opportunity time to continue transmitting to-be-transmitted radio frames to other stations;

or further comprising: after the second station transmits the radio frame to the third station within the remaining transmission opportunity time, the second station requesting the first station to release a transmission opportunity, and requesting to return a control right of the transmission opportunity to the first station.

12. A method for transmitting data in a wireless local area network, comprising:

a second station receiving a radio frame transmitted by a first station within a transmission opportunity obtained by the first station, wherein the radio frame carries notification information for the second station using the transmission opportunity to communicate with a third station;

wherein the notification information indicates whether the second station uses the transmission opportunity to communicate with the third station or not;

when the notification information indicates permitting the second station to use the transmission opportunity to communicate with the third station, after the second station receives the radio frame transmitted by the first station within the transmission opportunity obtained by the first station, the second station using one or more bits in a radio frame subsequently transmitted to the first station to indicate the second station accepting a permission of the first station and using the transmission opportunity to transmit radio frames to the third station;

or, the second station using one or more bits in a radio frame subsequently transmitted to the first station to indicate the second station not accepting a permission of the first station and the first station continuing to use the transmission opportunity.

13. The method of claim 12, wherein, the first station is an access point (AP), the second station is a relay, and the third station is a station (STA);

or the first station is a STA, the second station is a relay, and the third station is an AP.

14. The method of claim 13, wherein, the radio frame carries notification information in a physical header or a media access control (MAC) header, and the notification information is 1-bit or multi-bit information bit or signaling bit.

15. The method of claim 12, further comprising:

after the second station receives the radio frame transmitted by the first station within the transmission opportunity obtained by the first station, a second functional entity of the second station transmitting radio frames to the third station.

16. A system for transmitting data in a wireless local access network, comprising a first station, a second station and a third station, wherein:

the first station is configured to: transmit a radio frame to the second station within an obtained transmission opportunity, and carry, in the radio frame, notification information for the second station using the transmission opportunity to communicate with the third station; and the second station is configured to: receive the radio frame transmitted by the first station within the transmission opportunity obtained by the first station, wherein, the radio frame carries the notification information for the second station using the transmission opportunity to communicate with the third station;

wherein the notification information indicates whether the second station uses the transmission opportunity to communicate with the third station or not;

the second station is further configured to: when the notification information indicates permitting the second station to use the transmission opportunity to communicate with the third station, use one or more bits in a radio frame subsequently transmitted to the first station to indicate the second station accepting a permission of the first station and using the transmission opportunity to transmit radio frames to the third station;

or, the second station is further configured to: when the notification information indicates permitting the second station to use the transmission opportunity to communicate with the third station, use one or more bits within the radio frame subsequently sent to the first station to indicate the second station not accepting a permission of the first station and not using the transmission opportunity to transmit radio frames to the third station.

17. The system of claim 16, wherein,
the first station is an access point (AP), the second station is a relay, and the third station is a station (STA);
or
the first station is a STA, the second station is a relay, and the third station is an AP.

18. The system of claim 17, wherein,
the radio frame carries the notification information in a physical header or a media access control (MAC) header, and the notification information is 1-bit or multi-bit information bit or signaling bit.

19. The system of claim 16, wherein,
the first station is further configured to: receive a radio frame transmitted by the second station, and enter into dormancy; wherein the one or more bits in the radio frame indicates the second station accepting a permission of the first station;
or
the first station is further configured to: receive a radio frame transmitted by the second station, and continue to use the transmission opportunity; wherein the one or more bits in the radio frame indicates the second station not accepting a permission of the first station.

* * * * *